US012616979B2

(12) United States Patent
Rieck

(10) Patent No.: US 12,616,979 B2
(45) Date of Patent: May 5, 2026

(54) ANTI-CLOGGING DEVICE FOR DRYWASHER FLOW OPENING

(71) Applicant: Robert Rieck, Santa Ana, CA (US)

(72) Inventor: Robert Rieck, Santa Ana, CA (US)

( * ) Notice: Subject to any disclaimer, the term of this patent is extended or adjusted under 35 U.S.C. 154(b) by 0 days.

(21) Appl. No.: 19/033,151

(22) Filed: Jan. 21, 2025

(65) Prior Publication Data

US 2025/0256285 A1 Aug. 14, 2025

Related U.S. Application Data

(60) Provisional application No. 63/551,213, filed on Feb. 8, 2024.

(51) Int. Cl.
*B03B 4/02* (2006.01)
*B03B 4/06* (2006.01)

(52) U.S. Cl.
CPC ................ *B03B 4/02* (2013.01); *B03B 4/065* (2013.01)

(58) Field of Classification Search
CPC .................................. B03B 4/02; B03B 4/065
USPC .......................................................... 209/466
See application file for complete search history.

(56) References Cited

U.S. PATENT DOCUMENTS 185,116 A 12/1876 August
581,425 A * 4/1897 Mait ......................... B03B 4/00 209/498
803,830 A * 11/1905 Kennedy ................... B03B 4/00 209/471
984,866 A * 2/1911 Tate .......................... B03B 4/00 209/486
1,233,149 A 7/1917 Wall
1,858,421 A * 5/1932 Yost ..................... A01K 5/0241 119/902
2,226,723 A * 12/1940 Joy ........................ B65D 88/66 366/184
2,323,117 A * 6/1943 Carmo ................ A01K 39/012 119/55
2,435,039 A * 1/1948 Harper ............... B65G 65/4827 209/241
2,923,410 A 2/1960 Florian
3,799,415 A 3/1974 Tidd
3,897,667 A 8/1975 Turek
4,142,965 A 3/1979 Dolan
4,319,985 A 3/1982 Hibbard
4,375,491 A 3/1983 Honig
(Continued)

FOREIGN PATENT DOCUMENTS

AU 2013385357 B2 * 9/2016 ............... B03B 4/02

*Primary Examiner* — Terrell H Matthews
(74) *Attorney, Agent, or Firm* — Stetina Garred Brucker & Newboles

(57) ABSTRACT

A drywasher agitator is configured for use with a hopper and a recovery box. The hopper includes a flow opening formed therein to allow particulate within the hopper to pass through the flow opening and into the recovery box. The recovery box includes a main body and a panel extending from the main body. The agitator includes a wire having a first segment and a second segment. The first segment is connectable to the panel and extends along a first axis and a second segment extends along a second axis angled relative to the first axis. The wire is configured to extend from the panel and into the flow opening during use of the hopper and the recovery box to agitate particulate near the flow opening to mitigate clogging of particulate within the flow opening.

20 Claims, 5 Drawing Sheets

(56) References Cited

U.S. PATENT DOCUMENTS

| | | | | |
|---|---|---|---|---|
| 4,592,833 | A | 6/1986 | Perdue | |
| 4,615,797 | A | 10/1986 | Keene | |
| 4,676,891 | A | 6/1987 | Braa et al. | |
| 4,793,918 | A | 12/1988 | Thomas | |
| D302,018 | S | 7/1989 | Messenger et al. | |
| 5,087,351 | A * | 2/1992 | Valentine, Sr. | B03B 4/02 209/474 |
| 5,785,182 | A | 7/1998 | Ashcraft | |
| 5,927,508 | A | 7/1999 | Plath | |
| 6,065,606 | A | 5/2000 | Bonner | |
| 6,216,367 | B1 | 4/2001 | Tubbs | |
| 6,843,376 | B2 | 1/2005 | Dube et al. | |
| 7,093,719 | B2 | 8/2006 | Roper | |
| 7,461,746 | B1 | 12/2008 | Egge et al. | |
| 9,259,740 | B1 | 2/2016 | Rieck | |
| 2009/0078615 | A1 | 3/2009 | Rainwater et al. | |
| 2012/0000834 | A1 | 1/2012 | Rieck | |

* cited by examiner

ANTI-CLOGGING DEVICE FOR DRYWASHER FLOW OPENING

CROSS-REFERENCE TO RELATED APPLICATIONS

This patent application claims the benefit of U.S. Provisional Application Ser. No. 63/551,213, filed Feb. 8, 2024, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a device for use with a drywasher, and more particularly, to an agitator configured to break-up clogged particulate near a flow opening in a drywasher hopper.

2. Description of the Related Art

The mining of gold, and other precious metals, is a well-known practice. A common piece of equipment used when mining is a drywasher, which may be useful in separating the targeted material from the remaining particulate. A conventional drywasher may utilize forced air to separate heavier materials, like gold, from the lighter materials. A drywasher may include riffles which trap the desired heavier materials, while the lighter materials may be lifted by the forced air, and may flow over the riffles or be blown away.

The riffles used in a drywasher may be fitted within a recovery box, which may be positioned below a hopper which receives the raw material. A preliminary separation procedure may occur when the raw material is fed into the hopper, which may include a classifying screen. Large particulate may be prevented from passing through the screen, while small particulate passes through the screen and into the hopper. The small particulate travels downwardly through the hopper, and is fed to the recovery box through a flow opening formed in the hopper.

A significant drawback associated with conventional drywashers is that clogging may occur at, or near, the flow opening. In particular, the small particulate may accumulate and form a blockage to prevent flow through the flow opening. When such blockage occurs, a user may need to suspend operations, and manually clear the blockage. Once clear, the operation of the drywasher may resume. In some instances, blockages may occur every couple of minutes, which may test the patience of the user, as well as act as a severe limitation on the volume of material that may be processed by the drywasher.

Accordingly, there is a need in the art for a device which mitigates clogging or blockages at, or near, the flow opening on a drywasher. Various aspects of the present disclosure address this particular need, as will be discussed in more detail below.

BRIEF SUMMARY

In accordance with one embodiment of the present disclosure, there is provided a device specifically designed to reduce clogging in a drywasher. In particular, an anti-clogging device may be attached to a recovery box and may move with the vibrations of the recovery box during operation thereof to agitate particulate near a flow opening formed in a hopper positioned above the recovery box. The agitation provided by the device may mitigate clogging of particulate at the flow opening to allow for more continuous, uninterrupted operation of the drywasher.

According to one embodiment, there is provided a drywasher comprising a hopper having a base and a sidewall extending from the base. The base and sidewall collectively define a hopper reservoir, with the base having a flow opening formed therein and in communication with the hopper reservoir. The hopper is configured to receive particulate within the hopper reservoir and allow the particular to pass through the opening formed in the base. The drywasher additionally includes a recovery box having a main body and a panel extending from the main body. The recovery box is positionable in proximity to the hopper to receive at least a portion of the particulate having passed through the flow opening. The recovery box is configured to vibrate to facilitate sorting of the portion of the particulate received at the recovery box. An agitating body is connectable to the panel of the recovery box and is configured to extend from the panel and into the flow opening of the base when the agitating body is connected to the panel and the recovery box is in proximity to the hopper. The agitating body is moveable relative to the hopper to agitate particulate near the flow opening to mitigate clogging of particulate within the flow opening.

The agitating body may include a wire having a first segment extending along a first axis and a second segment extending along a second axis angled relative to the first axis. The agitating body may further include a threaded body extending around a portion of the wire. The threaded body may be tig welded to the wire. The panel may include an opening formed therein, and the threaded body may be advanceable through the opening in the panel to facilitate connection of the threaded body to the panel.

The wire of the agitating body may include a proximal end portion coupled to the panel and a distal end portion extending away from the panel, with the distal end portion having an enlarged body. The enlarged body may be of a bulbous configuration.

According to another embodiment, there is provided an agitator configured for use with a hopper and a recovery box. The hopper includes a flow opening formed therein to allow particulate within the hopper to pass through the flow opening and into the recovery box. The recovery box includes a main body and a panel extending from the main body. The agitator includes a wire having a first segment and a second segment. The first segment is connectable to the panel and extends along a first axis and a second segment extends along a second axis angled relative to the first axis. The wire is configured to extend from the panel and into the flow opening during use of the hopper and the recovery box.

According to yet another embodiment, there is provided a recovery box assembly configured for use with a hopper having a flow opening formed therein to allow particulate within the hopper to pass through the flow opening. The recovery box assembly includes a recovery box having a main body and a panel extending from the main body. The recovery box is positionable in proximity to the hopper to receive at least a portion of the particulate having passed through the opening. The recovery box is configured to vibrate to facilitate sorting of the portion of the particulate received at the recovery box. An agitating body is connectable to the panel of the recovery box and is configured to extend from the panel and into the flow opening when the agitating body is connected to the panel and the recovery box is in proximity to the hopper. The agitating body is moveable relative to the hopper to agitate particulate near the flow opening to mitigate clogging of particulate within the flow opening.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
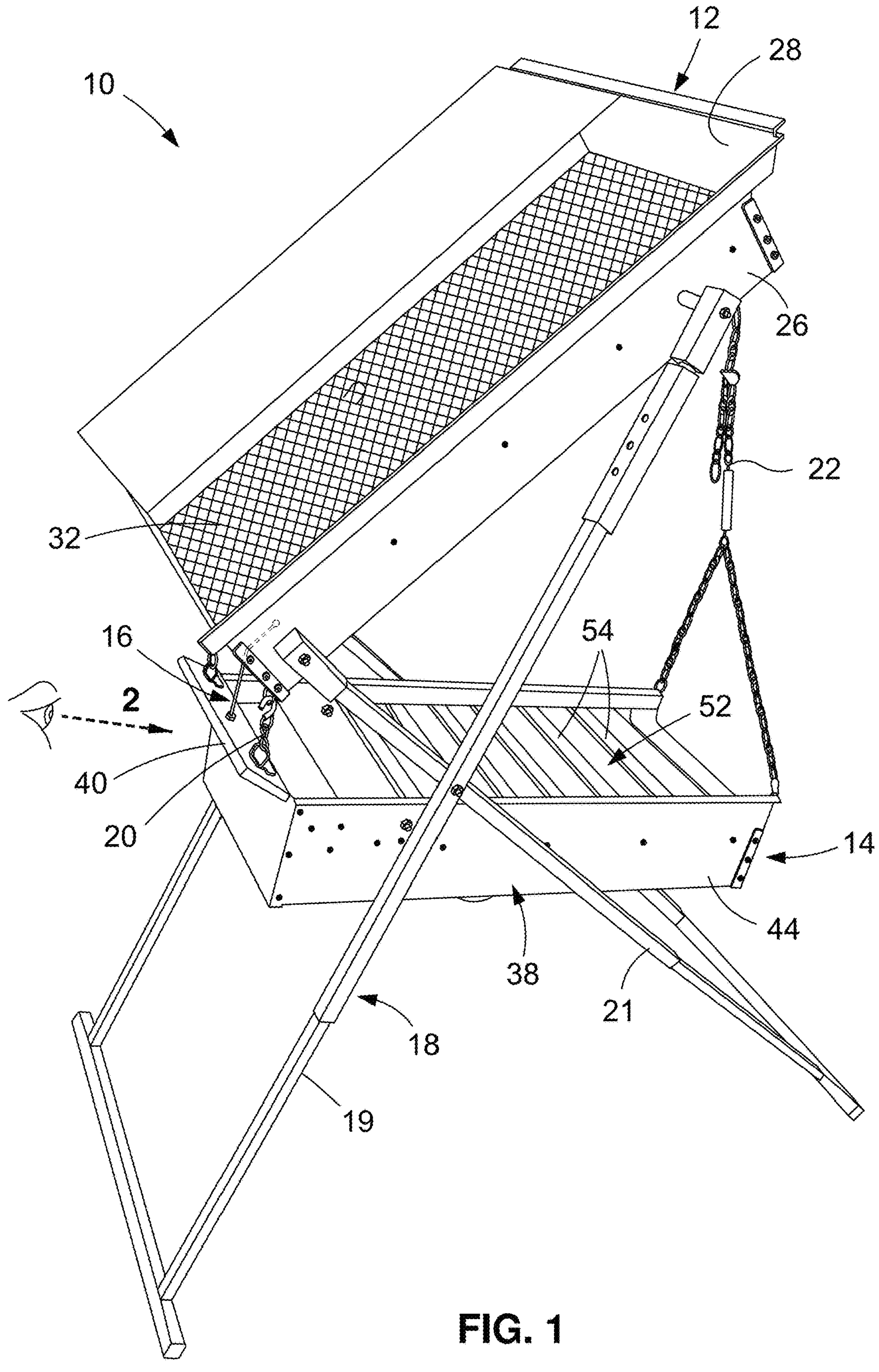
FIG. 1 is an upper perspective view of a drywasher having an agitating body coupled to a recovery box and extending into a flow opening of a hopper.
Figure 2:
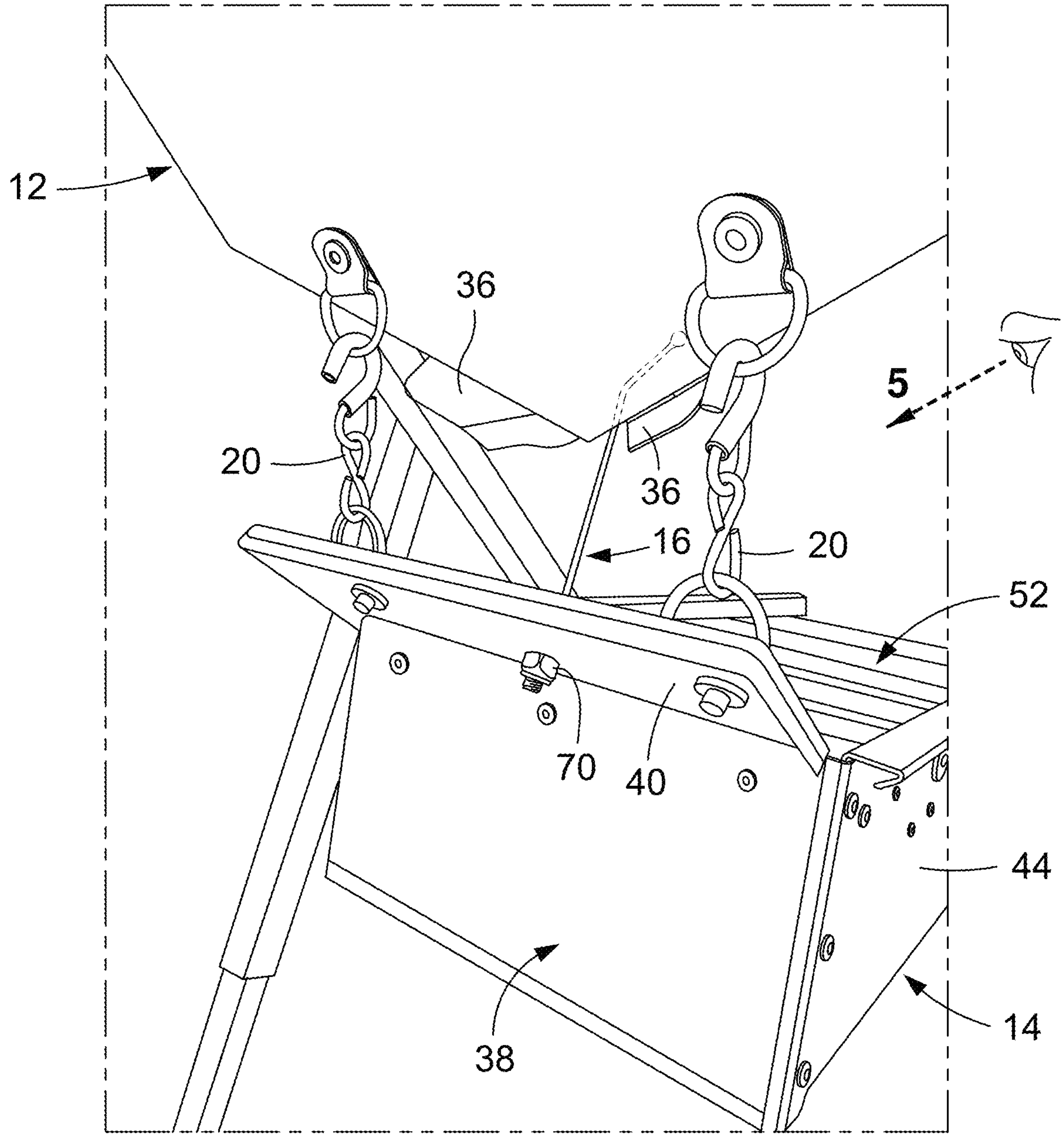
FIG. 2 is a partial, enlarged, rear, upper perspective view of the drywasher depicted in FIG. 1, particularly depicting the agitating body extending between the recovery box and the flow opening.
Figure 3:
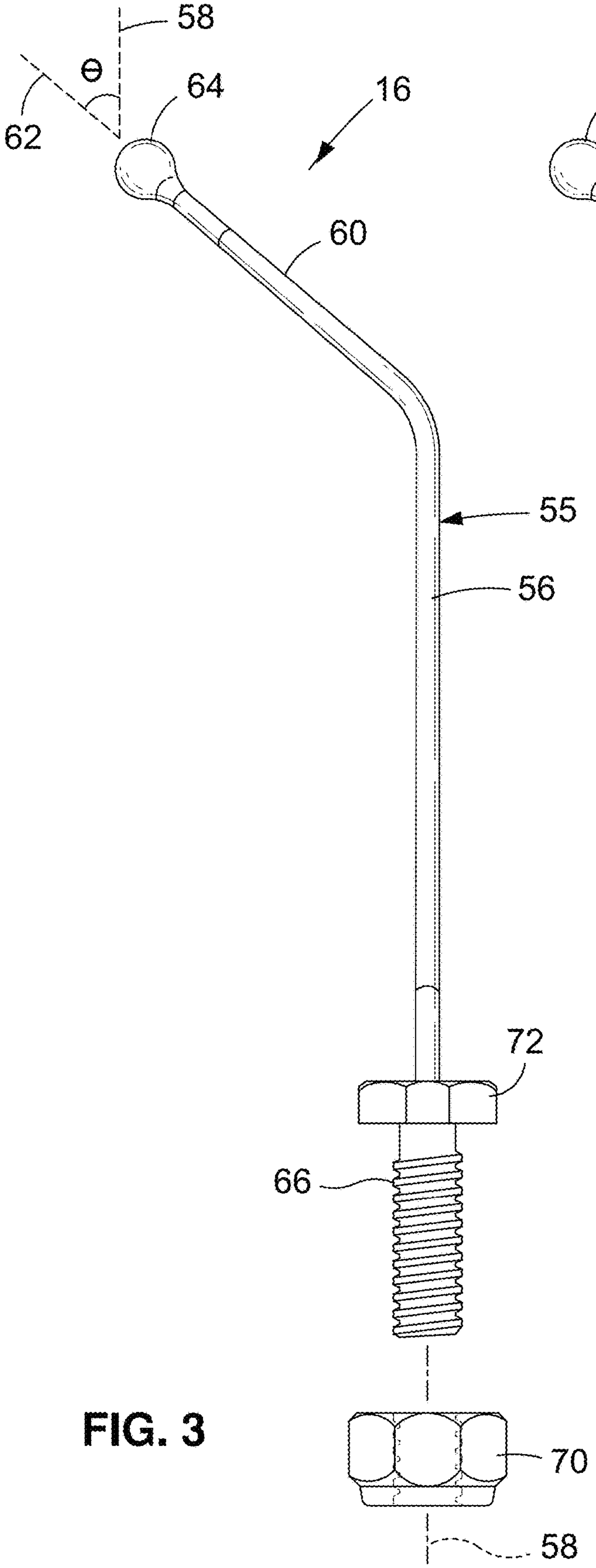
FIG. 3 is an exploded side view of the agitating body.
Figure 4:
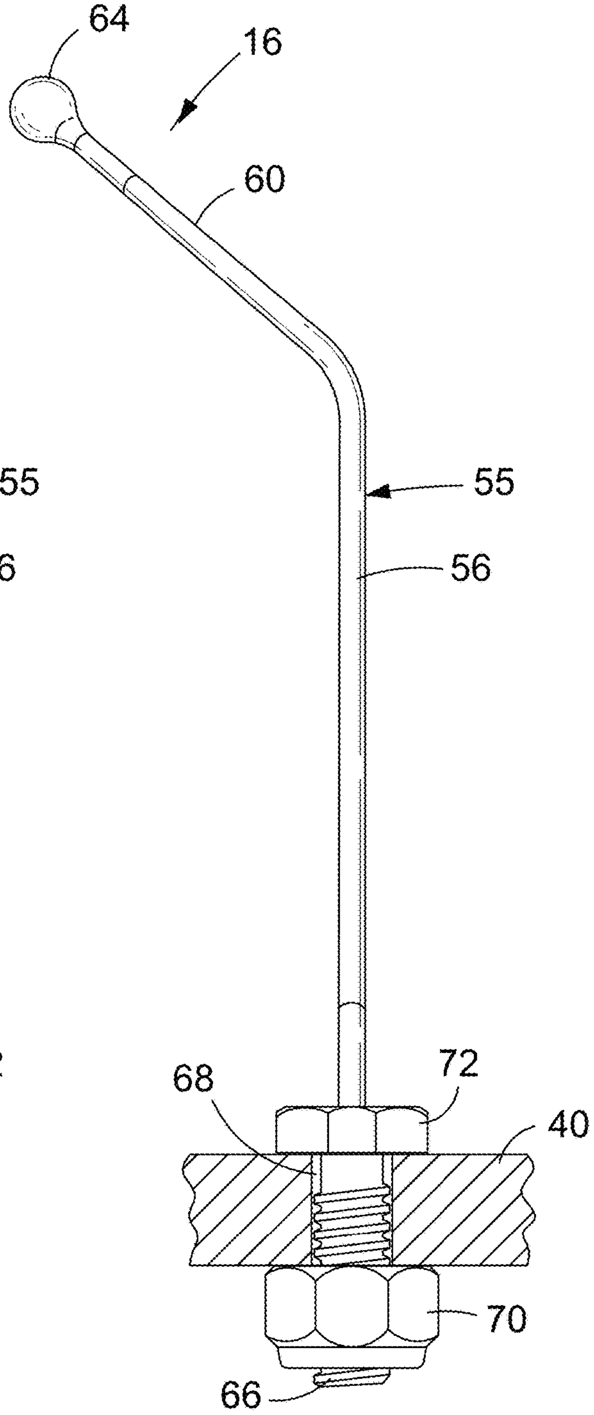
FIG. 4 is a cross sectional view of the agitating body coupled to a panel of the recovery box.
Figure 5:
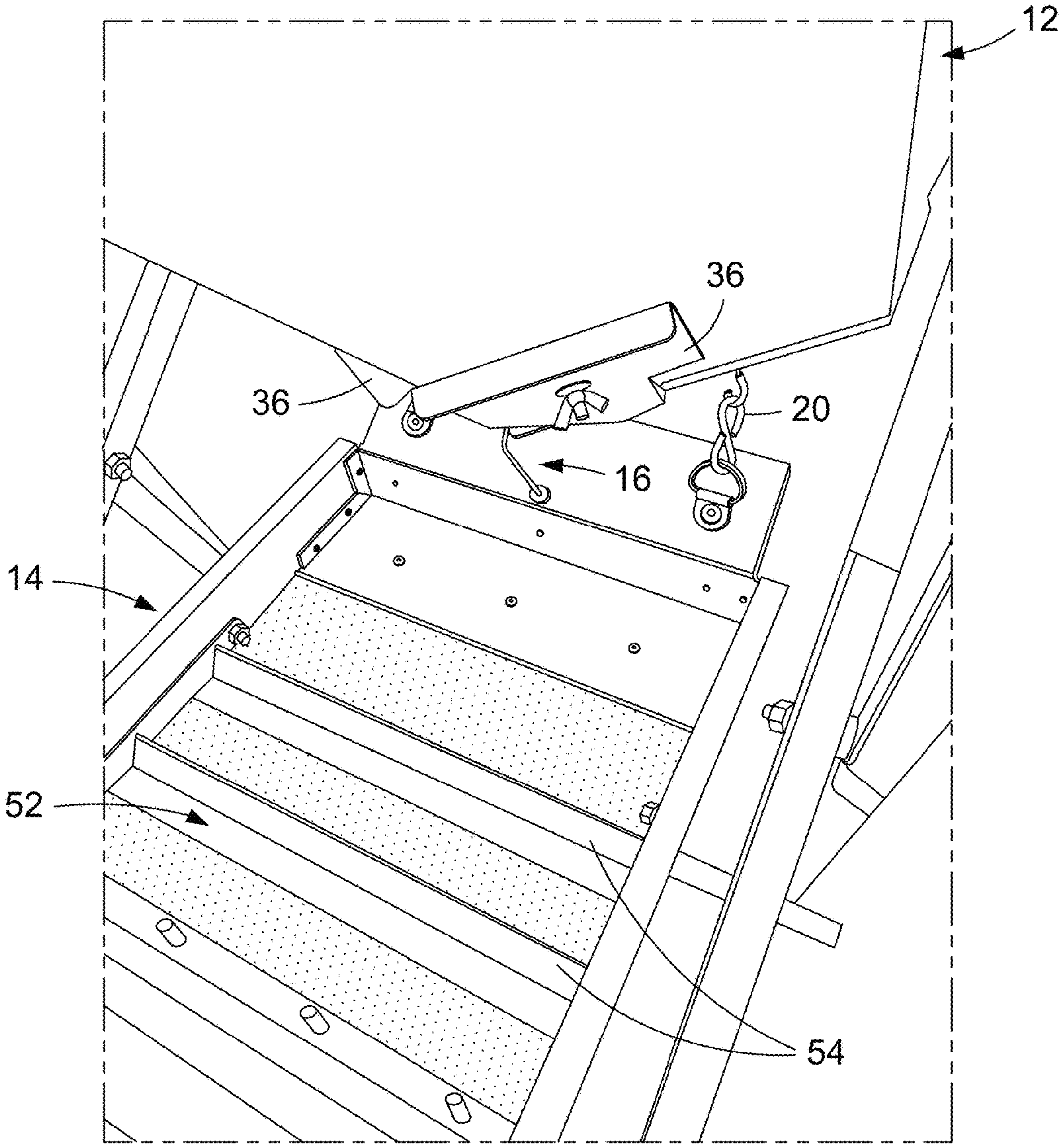
FIG. 5 is a partial, upper perspective view of the agitating body extending from the recovery box and into the flow opening of the hopper.
Figure 6:
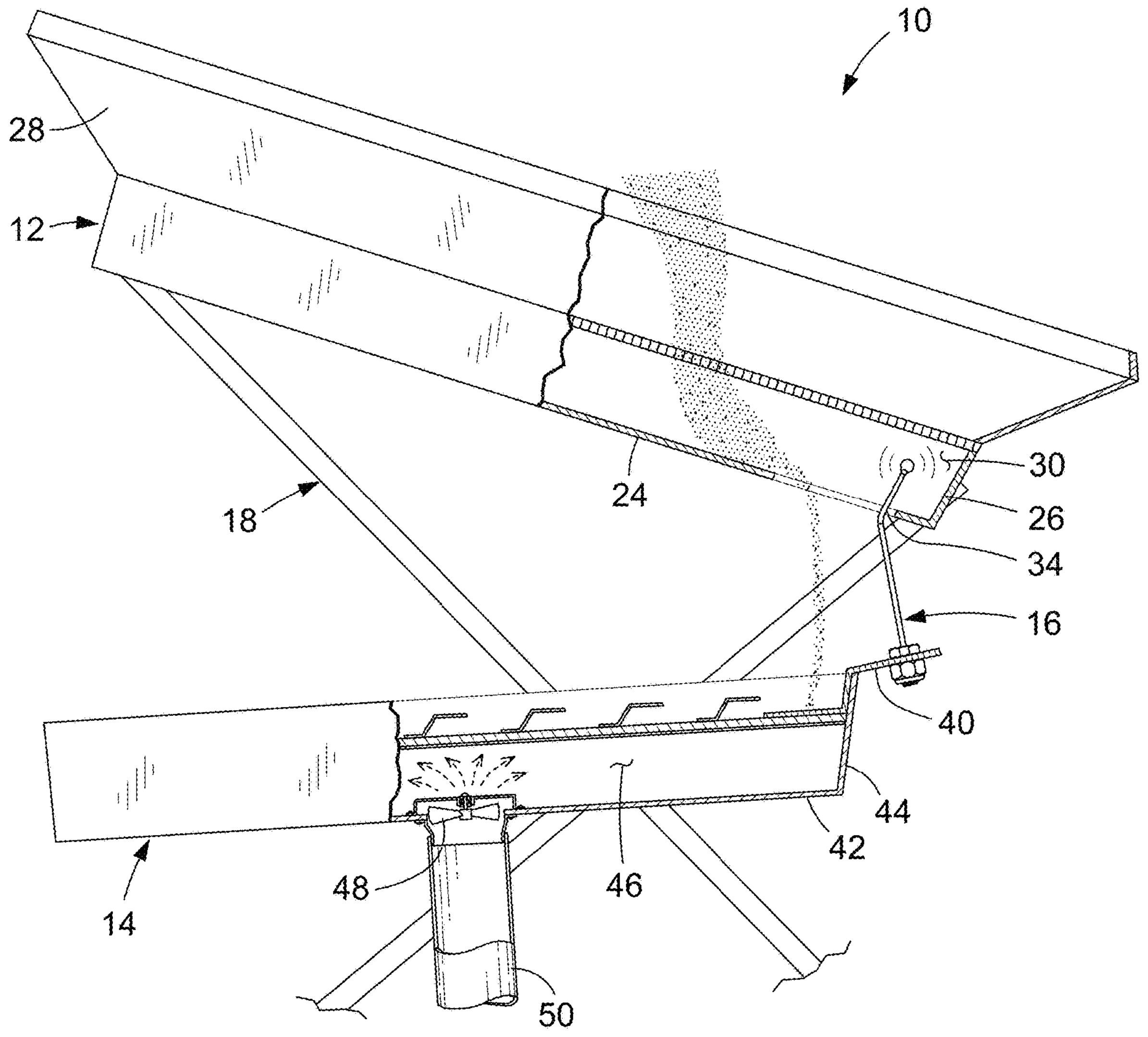
FIG. 6 is a partial, cross sectional view of the drywasher and hopper, with the agitating body extending from the drywasher into the flow opening of the hopper.

The detailed description set forth below in connection with the appended drawings is intended as a description of certain embodiments of an anti-clogging device for a drywasher and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to a drywasher specifically configured and adapted to allow for substantially continuous flow of particulate from an upper hopper to a lower recovery box by mitigating clogging of particulate flowing from the hopper to the recovery box. The drywasher may include an agitator coupled to the recovery box and configured to extend into a flow opening in the hopper. The agitator may vibrate during operation of the drywasher to move within the flow opening and break up congested particulate in, or near, the flow opening to facilitate particulate flow through the flow opening.

Referring now to the drawings, wherein the showings are for purposes of illustrating preferred embodiments of the present disclosure, and are not for purposes of limiting the same, there is depicted a drywasher 10 for separating precious metal deposits, such as silver and gold, from other sediment. The combination of precious metal deposits and other sediment that may be placed within the drywasher 10 may be referred to herein as particulate.

The drywasher 10 generally includes a hopper 12, a recovery box 14, and an agitator 16. FIG. 1 shows the drywasher 10 in a deployed configuration, with the hopper 12 being supported by a support frame 18 and the recovery box 14 being suspended from the hopper 12 by chains 20 at one end portion of the recovery box 14 and chains 22 at another end portion of the recovery box 14. The support frame 18 may include a first pair of support legs 19 and a second pair of support legs 21 pivotally connected to each other. The bottoms of the pairs of support legs 19, 21 may be moved relative to each other to stabilize the hopper 12 and the recovery box 14, while also allowing for adjustment in the angle at which the hopper 12 is oriented. In this regard, the first pair of support legs 19 may be attached to one end portion of the hopper 12, while the second pair of support legs 21 may be attached to another end portion of the hopper 12. The length of the support legs 19, 21 may be telescopically adjustable to selectively lengthen or shorten the support legs 19, 21, as may be desired.

The hopper 12 may include a base 24 and a sidewall 26 extending from the base 24. A peripheral funneling wall 28 may extend from the sidewall 26 at an angle, with the funneling wall 28 flaring upwardly and outwardly from the sidewall 26. The funneling wall 28 may be configured to catch particulate that may not fall directly into the footprint defined by the sidewall 26. It is contemplated that the funneling wall 28 may extend from only a portion of the sidewall 26. In the exemplary embodiment depicted in FIG. 1, the funneling wall 28 extends from only three sides of the sidewall 26, with a lower side of the sidewall 26 having no portion of the funneling wall 28 extending therefrom.

The base 24 and sidewall 26 may collectively define a hopper reservoir 30. A screen 32 may extend over the hopper reservoir 30 and may be configured to separate large particulate from smaller particulate. In particular, the screen 32 may have openings formed therein, such that smaller particulate may pass through the openings in the screen 32, while larger particulate may be prevented from passing through the openings in the screen 32. The screen 32 may be connected, or otherwise supported by the sidewall 26 and may be sized to substantially cover the hopper reservoir 30. In this regard, when the screen 32 is installed, the funneling wall 28 may extend upwardly and outwardly from the screen 32. It is contemplated that the screen 32 may be removed from the hopper 12 and replaced with a screen 32 having openings that are of different sizes. It is also contemplated that in other embodiments, the screen 32 may be riveted in place relative to the hopper 12.

The base 24 extends below the screen 32 and may include a flow opening 34 formed therein. The flow opening 34 may be formed adjacent an end portion of the hopper 12. As can be seen in FIG. 1, during use, the hopper 12 may be angled during use, with one end portion of the hopper 12 being raised or elevated above the opposite end portion of the hopper 12. The flow opening 34 may be formed in, or adjacent, the lower end portion of the hopper 12, which may also be the end of the hopper 12 formed without a funneling wall 28. The flow opening 34 is configured to be in communication with the hopper reservoir 30 and configured to allow smaller particulate to pass through the flow opening 34 to flow toward the recovery box 14. One or more opening adjustment panels 36 may be coupled to the base 24 and moveable relative to the flow opening 34 to selectively adjust the effective size of the flow opening 34. In particular, the adjustment panels 36 may be moveable (e.g., translatable, rotatable, etc.) relative to the base 24 to vary the degree to which each adjustment panel 36 overlaps with the flow opening 34. As the degree of overlap between the adjustment panel(s) 36 and the flow opening 34 increases, the effective size of the flow opening 34 decreases. Conversely, as the degree of overlap between the adjustment panel(s) 36 and the flow opening 34 decreases, the effective size of the flow opening 34 increases.

The recovery box 14 is positionable below the hopper 14 in a position to receive smaller particulate that falls through the flow opening 34. The recovery box 14 generally includes a main body 38 and a panel 40 extending from the main body 38. The main body 38 may include a bottom wall 42 and sidewall 44 extending from the bottom wall 42. The sidewall 44 may extend from a periphery of the bottom wall 42. In one particular embodiment, the sidewall 44 may extend from three edges of the bottom wall 42, with one edge (e.g., a lowermost edge) not having the sidewall 44 extending therefrom. The bottom wall 42 and the sidewall 44 may collectively define a recovery box cavity 46.

The bottom wall 42 may include an opening formed therein, and a blower may be connected to the recovery box 14 to blow air under pressure into the recovery box cavity 46. The air blown by the blower may facilitate separation of lighter particulate from heavier particulate, to aid in the particulate separation process. Furthermore, a fan 48 may be configured to create a vibration force, which may be transferred to the recovery box 14, such that when the fan 48 is operating, the recovery box 14 vibrates. The vibration caused by the fan 48 may be created by an asymmetrical weighting of the fan 48, i.e., one fan blade may be heavier or lighter than the remaining fan blades, such that when the fan 48 rotates, the fan 48 causes vibration of the recovery box 14.

It is contemplated that the fan 48 may be in communication with the blower which forces air under pressure through the fan 48, thereby causing rotation of the fan 48. A hose 50 may deliver the pressurized air from the blower to the fan 48. Alternatively, the fan 48 may be powered by an onboard motor to cause rotation of the fan 48.

The recovery box 14 may be fitted with various inserts configured to facilitate separation of the particulate received at the recovery box 14 in response to air being blown into the recovery box 14 and in response to vibration of the recovery box 14. For instance, a riffle assembly 52 having a plurality of riffle structures 54 may be inserted into the recovery box 14. A diffuser plate and fibrous mat may be placed under the riffle assembly 52 to aid in distributing the pressurized air, and also to facilitate in the separation of the particulate. For more information regarding the riffle assembly, please refer to U.S. Pat. No. 9,259,740 entitled EXTENDED RIFFLE STRUCTURE FOR A DRYWASHER, U.S. Pat. No. 9,259,740 entitled EXTENDED RIFFLE STRUCTURE FOR A DRYWASHER, the contents of which are expressly incorporated herein by reference.

As noted above, the recovery box 14 includes a panel 40 extending at an upward and rearward angle from an elevated end portion of the recovery box 14 during use. The panel 40 may be configured to function as a wind shield by blocking wind blowing across the top of the recovery box 14.

The agitator 16 (e.g., agitating body) is connectable to the panel 40 and is configured to extend from the panel 40 and into the flow opening 34 during use of the drywasher 10. In more detail, the agitating body 16 may include a wire 55 having a first segment 56 extending along a first axis 58 and a second segment 60 extending along a second axis 62 angled relative to the first axis 58 by an angle Θ. The angle Θ between the first axis 58 and the second axis 62 may be between 10°-80°, and in some embodiments, between 35°-60°. The angle Θ between the first segment 56 and the second segment 60 may facilitate deployment of the drywasher 10, and in particular, positioning of the recovery box 14 relative to the hopper 12, when setting up the drywasher 10 in a desired location.

The wire 55 may be formed from high carbon steel (e.g., hardened piano wire), or other similar materials known in the art. The wire 55 may include a proximal end portion coupled to the panel 40 and a distal end portion extending away from the panel 40. In one embodiment, the distal end portion may include an enlarged body 64, which may be of a bulbous configuration. The enlarged body 64 may be configured to protect a user from scratching or catching on the user's clothes during set up or tear down of the drywasher 10, and in particular, when moving the hopper 12 having the agitator 16 connected thereto.

The agitator 16 may further include a threaded body 66 extending around a portion of the wire 55. In one embodiment, the threaded body 66 includes a bolt having a hole or aperture formed therein, which accommodates receipt of the wire 55. The threaded body 66 may be tig welded to the wire 55 or secured to the wire 55 via other means known in the art, such as via press-fitting, the use of adhesives or other mechanical fasteners.

The agitator 16 may be secured to the panel 40 via an opening 68 formed in the panel 40. In retrofit implementations, the opening 68 may need to be formed in the panel 40 with a drill. The threaded body 66 may be advanceable through the opening 68 such that a shaft of the threaded body extends through the opening 68 with a distal end portion of the shaft protruding through the opening 68 by an amount which allows for threaded engagement with a nut 70, or other securing/locking mechanisms known in the art. The threaded body 66 may also include a head 72 fixed to the shaft, with the head and the nut 70 being disposed on opposite sides of the panel 40, and resting tightly against the panel 40, i.e., the panel 40 is slightly compressed between head 72 and nut 70.

With the basic structure of the drywasher 10 having been described above, the following discussion relates to an exemplary use of the drywasher 10. With the agitator 16 attached to the panel 40 according to the attachment described above, the drywasher 10 is set up/assembled by setting up support frame 18 and hopper 12. The hopper 12 may be angled to achieve a downward flow of the particulate toward a desired end of the hopper 12.

The recovery box 14 is moved into position below the hopper 12, with the agitator 16 being coupled to the recovery box 14. The distal end portion of the agitator 16 is moved into proximity to the flow opening 34 of the hopper 12. Once the distal end portion of the agitator 16 is aligned with the flow opening 34, e.g., once the second axis 62 extends through the flow opening 34, the user moves the recovery box 14 to slightly advance the distal end portion of the agitator 16 into the flow opening 34. Once the recovery box 14 is so positioned, the recovery box 14 is attached to the hopper 12 via the chains 20, 22. The chains 20, 22 may include hooks that may attached to corresponding rings formed on one of the recovery box 12 or hopper 12 to facilitate such attachment. The effective length of the chains 20, 22 may be adjusted to eliminate any slack, or alternatively, create additional length, to allow the recovery box 14 to assume a desired position and angular orientation relative to the hopper 12. If a blower is used in connection with the recovery box 14, the blower and/or an associated hose 50 may be connected to the recovery box 14.

After the drywasher 10 is set up, the blower may be turned on, which causes pressurized air to move through the hose and induce rotation of the fan 48. As the fan 48 rotates, the recovery box 14 vibrates, which in turn, causes vibration of the agitator 16 within the flow opening 34, relative to the hopper 12.

The user may load the hopper 12 with particulate, with larger particulate being separated from the smaller particulate via screen 32. The smaller particulate falls into the hopper reservoir 30, and moves toward the flow opening 34 due to the angular orientation of the hopper 12. The smaller particulate passes through the flow opening 34 and into the recovery box 14 for further separation.

Over time, the smaller particulate within the hopper reservoir 30 may begin to accumulate near the flow opening 34. The position of the agitator 16 and the movement of the agitator 16, via the vibration of the recovery box 14, may break up accumulated particulate, thereby allowing the broken-up particulate to more freely move through the flow opening 34. The agitator 16 may also move rocks or other larger objects that may obstruct passage through the flow opening 34. Thus, the incorporation of the agitator 16 may allow for more continuous, uninterrupted flow of particulate through the flow opening 34. As such, the user may not need to pay close attention to possible buildup of particulate near the flow opening 34, and may not need to shut down operation to clear any buildup. Thus, the agitator saves time and effort during operation of the drywasher 10.

While the foregoing describes the agitator 16 as initially being separate from the recovery box 14, it is contemplated that in certain embodiments, the agitator 16 may be incorporated into the recovery box 14 during initial assembly thereof, or may be more permanently attached to the recovery box, such as via welding of the agitator 16 to the recovery box 14.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A drywasher comprising:

a hopper having a base and a sidewall extending from the base, the base and sidewall collectively defining a hopper reservoir, the base having a flow opening formed therein and in communication with the hopper reservoir, the hopper being configured to receive particulate within the hopper reservoir allow the particulate to pass through the flow opening formed in the base;

a recovery box having a main body and a panel extending from the main body, the recovery box being positionable in proximity to the hopper to receive at least a portion of the particulate having passed through the flow opening, the recovery box being configured to vibrate to facilitate sorting of the at least a portion of the particulate received at the recovery box; and an agitating body connectable to the panel of the recovery box so as to move in concert with the recovery box relative to the hopper, the agitating body being configured to extend from the panel and into the flow opening when the agitating body is connected to the panel and the recovery box is in proximity to the hopper, the agitating body being moveable relative to the hopper to agitate particulate near the flow opening to mitigate clogging of particulate within the flow opening.

2. The drywasher recited in claim 1, wherein the agitating body includes a wire having a first segment extending along a first axis and a second segment extending along a second axis angled relative to the first axis.

3. The drywasher recited in claim 2, wherein the agitating body further includes a threaded body extending around a portion of the wire.

4. The drywasher recited in claim 3, wherein the threaded body is tig welded to the wire.

5. The drywasher recited in claim 3, wherein the panel includes an opening formed therein, the threaded body being advanceable through the opening in the panel to facilitate connection of the threaded body to the panel.

6. The drywasher recited in claim 1, wherein the agitating body includes a wire having a proximal end portion coupled to the panel and a distal end portion extending away from the panel, the distal end portion having an enlarged body.

7. The drywasher recited in claim 6, wherein the enlarged body of a bulbous configuration.

8. An agitator configured for use with a hopper and a recovery box, the hopper having a flow opening formed therein to allow particulate within the hopper to pass through the flow opening and into the recovery box, the recovery box having a main body and a panel extending from the main body, the agitator comprising:

a wire having a first segment and a second segment, the first segment being connectable to the panel and extending along a first axis and a second segment extending along a second axis angled relative to the first axis, the wire being configured to extend from the panel and into the flow opening during use of the hopper and the recovery box;

a threaded body extending around a portion of the wire; and the wire terminating in a bulbous enlargement at an end thereof, the bulbous enlargement being sized to remain within the flow opening during vibration.

9. The agitator recited in claim 8, wherein the threaded body is tig welded to the wire.

10. The agitator recited in claim 8, wherein the wire is formed from high carbon steel.

11. A recovery box assembly configured for use with a hopper having a flow opening formed therein to allow particulate within the hopper to pass through the flow opening, the recovery box assembly comprising:

a recovery box having a main body and a panel extending from the main body, the recovery box being positionable in proximity to the hopper to receive at least a portion of the particulate having passed through the flow opening, the recovery box being configured to vibrate to facilitate sorting of the at least a portion of the particulate received at the recovery box; and an agitating body connectable to the panel of the recovery box so as to move in concert with the recovery box relative to the hopper, the agitating body being configured to extend from the panel and into the flow opening when the agitating body is connected to the panel and the recovery box is in proximity to the hopper, the agitating body being moveable relative to the hopper to agitate particulate near the flow opening to mitigate clogging of particulate within the flow opening.

12. The recovery box assembly recited in claim 11, wherein the agitating body includes a wire having a first segment extending along a first axis and a second segment extending along a second axis angled relative to the first axis.

13. The recovery box assembly recited in claim 12, wherein the agitating body further includes a threaded body extending around a portion of the wire.

14. The recovery box assembly recited in claim 13, wherein the panel includes an opening formed therein, the threaded body being advanceable through the opening in the panel to facilitate connection of the threaded body to the panel.

15. The recovery box assembly recited in claim 13, wherein the threaded body is tig welded to the wire.

16. The recovery box assembly recited in claim 11, wherein the agitating body include a wire having a proximal end portion coupled to the panel and a distal end portion extending away from the panel, the distal end portion having an enlarged body.

17. The recovery box assembly recited in claim 15, wherein the enlarged body of a bulbous configuration.

18. The drywasher recited in claim 1, wherein the agitating body is mounted exclusively to the panel of the recovery box, the panel being spaced from and out of contact with the hopper during operation, the agitating body being devoid of any direct attachment to the hopper.

19. The drywasher of claim 1, wherein the panel extends at an upward and rearward angle from an elevated end portion of the recovery box and is configured to function as a wind shield.

20. The drywasher of claim 1, wherein the agitating body includes a threaded body extending around a portion of the wire, the threaded body being advanceable through an opening formed in the panel so that a shaft of the threaded body extends through the opening for threaded engagement with a nut.

* * * * *